United States Patent
Nihira

[11] Patent Number: 5,959,210
[45] Date of Patent: Sep. 28, 1999

[54] VIBRATION DETECTING APPARATUS AND NOISE ABSORBENT MEMBER

[75] Inventor: Katsunari Nihira, Tokyo, Japan

[73] Assignee: Fuji Tecom Inc., Tokyo, Japan

[21] Appl. No.: 08/876,095

[22] Filed: Jun. 10, 1997

[30] Foreign Application Priority Data

May 26, 1997 [JP] Japan .................................. 9-135163

[51] Int. Cl.⁶ ............................................... G01H 11/06
[52] U.S. Cl. ................................ 73/587; 73/649; 181/206
[58] Field of Search .............................. 73/587, 405 A, 73/584, 649; 181/206

[56] References Cited

U.S. PATENT DOCUMENTS

| | | | |
|---|---|---|---|
| 3,458,656 | 7/1969 | Sewerin | 73/584 |
| 4,125,238 | 11/1978 | Tanaka | 248/56 |
| 4,309,576 | 1/1982 | Corrigan | 73/584 |
| 4,577,496 | 3/1986 | Grover et al. | 73/119 A |
| 4,911,012 | 3/1990 | Ziska | 73/584 |
| 5,243,127 | 9/1993 | Kitagawa | 174/35 R |
| 5,324,207 | 6/1994 | Itoh et al. | 439/125 |

*Primary Examiner*—Hezron Williams
*Assistant Examiner*—Rose M. Miller
*Attorney, Agent, or Firm*—McDermott, Will & Emery

[57] ABSTRACT

The vibration detecting apparatus comprises a pickup 2 encasing a piezoelectric element 8 therein, a cord 3 for transmitting an electric signal output by said piezoelectric element 8, and a noise absorbent member 4 in the form of a lump made of rubber, and formed therein with a cord insert path having at least one direction-changing portion 14a, said noise absorbent member being mounted at a suitable position of said cord. The noise absorbent member is preferably made of low repulsion elastic rubber and is preferably spherical. The cord inser path 14 is preferably in the shape of substantially U. According to the aforementioned construction, noises such as a wind-cut sound and a frictional sound generated at the cord can be effectively removed.

9 Claims, 6 Drawing Sheets

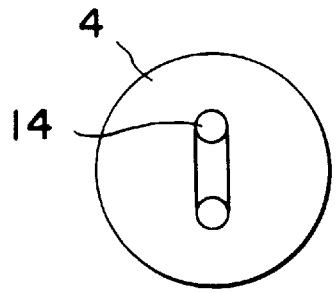
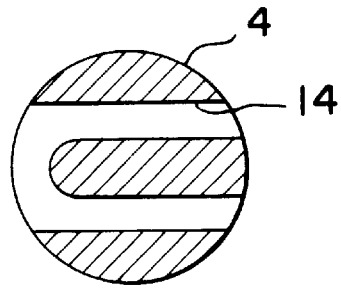
FIG. 2(A)  FIG. 2(B)
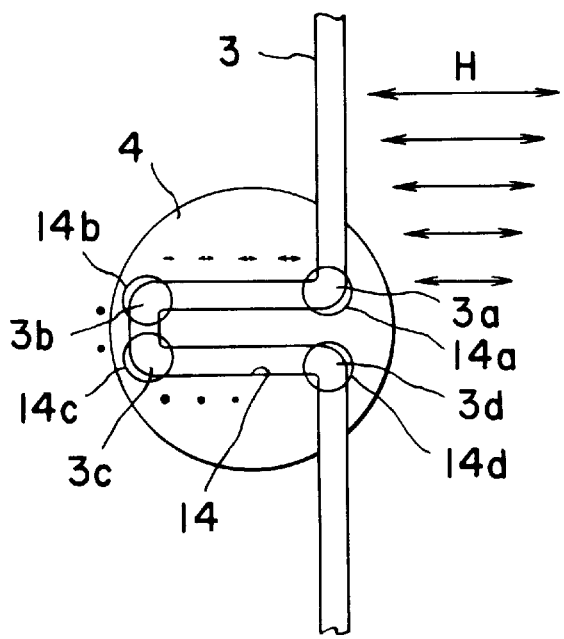
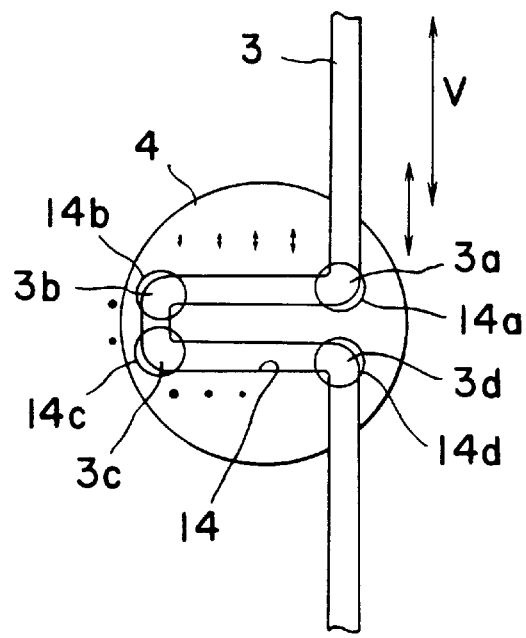
FIG. 3(A)  FIG. 3(B)

VIBRATION DETECTING APPARATUS AND NOISE ABSORBENT MEMBER

BACKGROUND OF THE INVENTION

1. Field of the Invention

The present invention principally relates to a vibration detection apparatus for reducing noises generated as a result of vibration of cord, and a noise absorbent member for absorbing the noises.

2. Description of the Prior Art

A water-leakage detector 51 as shown in FIG. 6 has been heretofore used to detect a leakage of water in a water pipe laid under the ground. The water-leakage detector 51 comprises a vibration detecting apparatus 52 comprising a pickup 53 and a cord 54, a voltage amplifier 55 and a head-phone 56.

A water-leakage sound in the form of a fine vibration generated at a water-leakage point of the water pipe and propagated through the ground is picked up by the pickup 53 set on the ground to convert the sound into an electric signal, which is transmitted to the voltage amplifier 55 through the cord 54, and the electric signal is voltage-amplified to an audible level by the voltage amplifier 55. An operator listens to the amplified signal sound by the head-phone 56, and the presence or absence and position of the leakage of water are detected by the stress, pitch and the like.

In detecting the leakage of water, the operator holds the voltage amplifier 55 or places it on the stand to perform his work. Therefore, the cord 54 for connecting the pickup 53 to the voltage amplifier 55 is in an unstable state in the air. As a result, when the wind blows against the cord 54, the cord 54 finely vibrates in a horizontal direction to generate a wind-cut sound, and when the operator holds the cord 54 by his hand, the cord 54 finely vibrates in a vertical direction to generate a frictional sound.

On the other hand, since the water-leakage sound propagated through the ground is in the form of an extremely fine vibration, when the noise as described above is picked up by the pickup 53, the noise cannot be sufficiently discriminated from the water-leakage sound to impede the detection of leakage of water. Thus, the utmost care should be paid so as not to generate the noise as described above, deteriorating the efficiency of the water-leakage detection work.

In view of the foregoing, a vibration detecting apparatus 62 as shown in FIG. 7 has been invented and used to damp the noise as described above before it is picked up by the pickup 53. In this vibration detecting apparatus 62, a cord 64 is formed with a winding portion 64*a*, in addition to the constitution of the vibration detecting apparatus 52 shown in FIG. 6. Since the vibration direction is changed by the winding portion 64*a*, the noise can be damped, and since the winding portion 64*a* comprises an inertia mass, the noise can be absorbed.

However, in the vibration detecting apparatus 62 shown in FIG. 7, the winding portion 64*a* is oscillated by the wind or expanded and contracted in a vertical direction whereby the adjacent cord portions of the winding portion 64*a* collide with each other to generate a large frictional sound.

SUMMARY OF THE INVENTION

An object of the present invention is to provide a vibration detecting apparatus in which even when a wind-cut sound, a frictional sound or the like is generated in a cord, this can be effectively removed, and the efficiency of water-leakage detection work can be enhanced.

A further object of the invention is to provide a noise absorbent member capable of removing the noise as described above.

The vibration detecting apparatus according to the present invention comprises a pickup encasing a piezoelectric element therein, a cord for transmitting an electric signal output by the piezoelectric element, and a noise absorbent member in the form of a lump made of rubber, and formed therein with a cord insert path having at least one direction-changing portion, said noise absorbent member being mounted at a suitable position of said cord.

According to the aforementioned construction, both horizontal and vertical fine vibrations generated in the cord can be materially damped by the noise absorbent member, the fine vibrations are rarely detected in the pickup, and an inconvenience of entry of the noise generated by the cord into a detection signal is hard to occur.

The noise absorbent member according to the present invention constituting the vibration detecting apparatus is in the form of a lump made of rubber and formed therein the cord insert path provided with at least one direction changing portion.

When the cord is inserted into the cord insert path of the noise absorbent member, the cord is bended at the direction changing portion of the cord insert path and hardened at the bent portion to improve the vibration absorbent characteristic. Further, the vibration direction is changed at the bent portion, and the vibration is rapidly damped. Furthermore, since the vibration is absorbed by action of material itself of the noise absorbent member and action as an inertia mass, the fine vibrations generated in the cord is materially reduced at the noise absorbent member.

BRIEF DESCRIPTION OF THE DRAWINGS

FIG. 2(A) is a front view of one embodiment of a noise absorbent member according to the present invention, and FIG. 2(B) is a sectional view.

FIG. 3 is an explanatory view showing the function of the noise absorbent member which absorbs a vibration of a cord.

DESCRIPTION OF THE PREFERRED EMBODIMENTS

Figure 1:
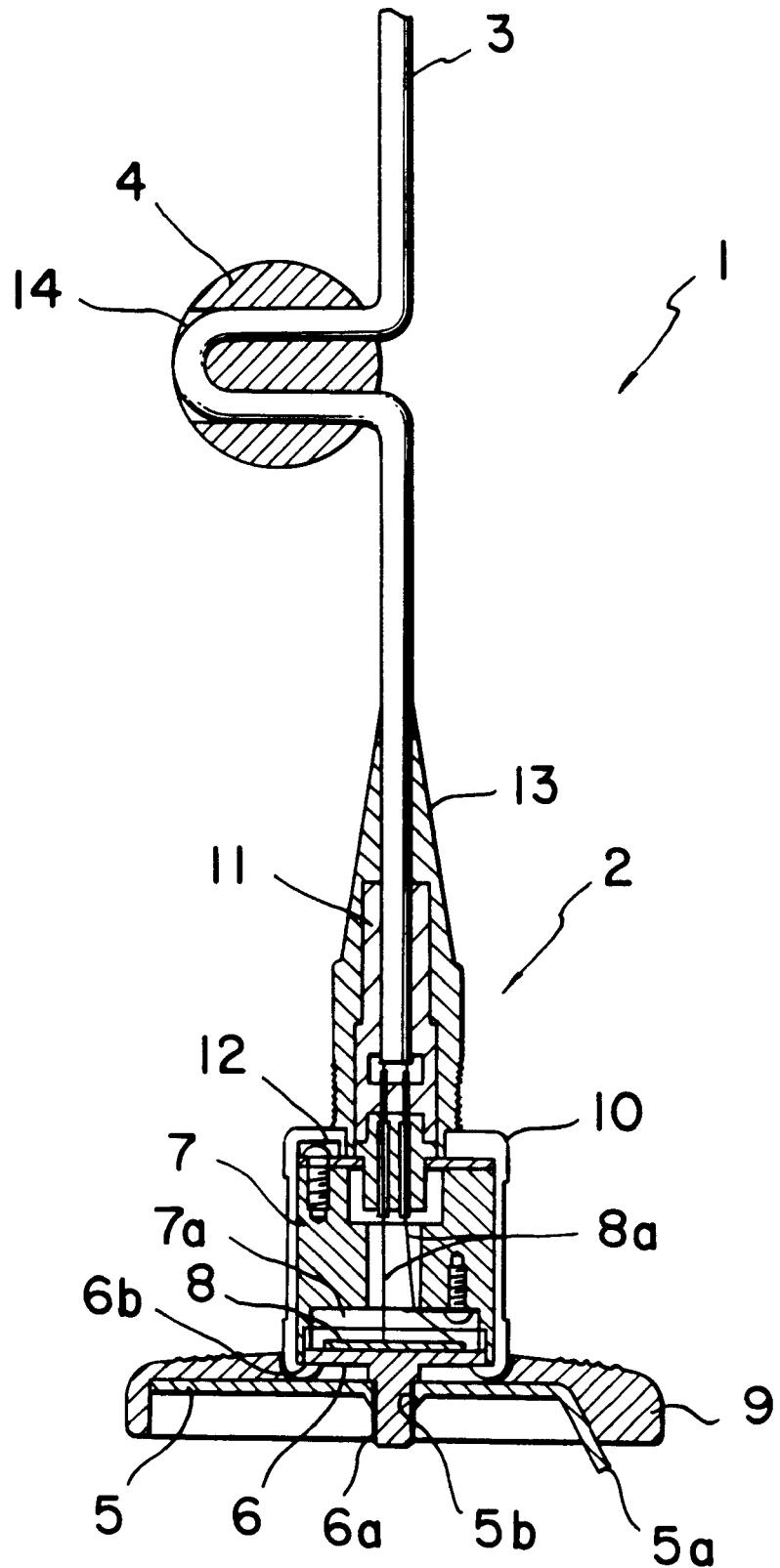
FIG. 1 is a sectional view of one embodiment of the vibration detecting apparatus according to the present invention.
Figure 4:
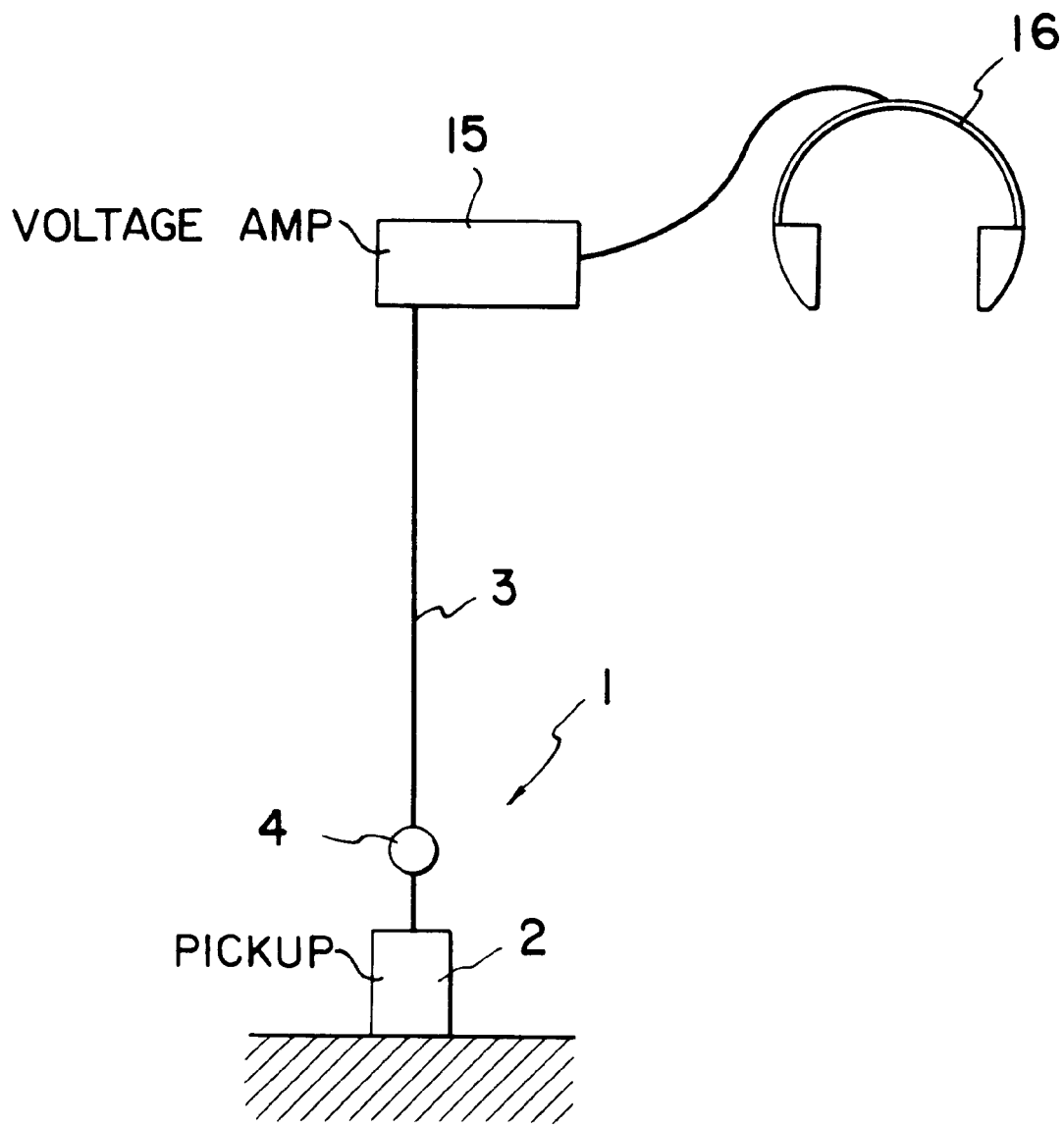
FIG. 4 is a constitutional view of a water-leakage detector in the case where the vibration detecting apparatus of the present invention is used.

The vibration detecting apparatus 1 according to the present invention comprises a pickup 2, a cord 3, and a noise absorbent member 4, as shown in FIG. 1.

The pickup 2 comprises a place bed 5, vibrators 6, 7, a piezoelectric element 8, and covers 9, 10, as shown in FIG. 1.

The place bed 5 is formed with legs 5a, 5a, 5a by bending a metal plate, and with a tapped hole 5b bored in the central portion thereof.

The vibrator 6 is made of metal, lower end portion of which comprises an external thread portion 6a, and upper end portion of which comprises a disk-like portion 6b. The external thread portion 6a is engaged with the tapped hole 5b, and a piezoelectric element 8 is secured to the upper surface of the disk-like portion 6b.

The vibrator 7 is made of metal and is cylindrical having a through-hole 7a formed in the central portion thereof. The disk-like portion 6b is fitted in the lower end portion of the through-hole 7a.

The covers 9, 10 are made of rubber, the cover 9 and the cover 10 covering the place bed 5 and the vibrators 6, 7, respectively.

The cord 3 is constituted by coating conductors with a protective material such as vinyl chloride, one end of which is connected to a connector 11, and secured to the upper end of the vibrator 7 through an anti-rotation plate 12. It is then connected to harnesses 8a, 8a of the piezoelectric element 8 located upward.

A connecting portion of the connector 11 is also covered with a cover 13 made of rubber.

The noise absorbent member 4 is made of rubber and is spherical, interiorly of which is formed a cord insert path 14 substantially in the shape of U, as shown in FIG. 2.

The noise absorbent member 4 exhibits the effect as intended as long as it is made of rubber. A particularly preferable material of the noise absorbent member 4 is an low repulsion elastic rubber having high vibration absorbent characteristic. Further, the use of a material having a high specific gravity is preferable in consideration of inertia mass per shape and dimension.

The shape is most preferably spherical in consideration of the total balance and design, etc. If it is in the form of a lump at least having a moderate inertia mass, the vibration suppressing effect by way of inertial force can be obtained.

The shape, the dimension and the weight are suitably selected in consideration of the length and outside diameter of the cord 3, and the shape and weight of the pickup 2.

The inside diameter of the cord insert path 14 will suffice to be at least larger than the outside diameter of the cord 3. However, particularly, the inside diameter of the cord insert path 4 is preferably substantially the same as the outside diameter of the cord 3 so that the cord 3 can be inserted without being slipped out easily and can be held in a stable manner.

The cord insert path 14 is preferably in the shape of substantially U in consideration of manufacture of the noise absorbent member 4, insertion of the cord 3 and so on, but a substantially V-shape, a substantially Ω-shape or the like may be used. At least one direction changing portion for bending the cord 3 will suffice to be present.

Preferably, the noise absorbent member 4 is mounted at the lower part of the cord 3, that is, in the vicinity of the pickup 2.

It is because of the fact that when the noise absorbent member 4 is mounted above the central portion of the cord 3, the wind-cut sound and frictional sound generated below the central portion of the cord 3 cannot be removed effectively.

The function of the noise absorbent member 4 will be described hereinafter with reference to FIG. 3.

As shown in FIG. 3, when the cord 3 is inserted into the cord insert path 14 of the noise absorbent member 4, the cord 3 is bended through approximately 90° at direction changing portions 14a, 14b, 14c and 14d of the cord insert path 14. At bended portions 3a, 3b, 3c and 3d, the coating material of the cord 3 is hardened to enhance the vibration absorbent characteristic.

Even if the wind blows against the cord 3 so that the fine vibrations are generated in the horizontal direction H, as shown in FIG. 3(A), when the fine vibrations reach the portion of the cord 3 inserted in the noise absorbent member 4, the vibration direction is changed at the bended portion 3a to absorb the vibrations and to rapidly damp the fine vibrations in the horizontal direction H. Similarly, the fine vibrations in the horizontal direction are rapidly damped also at the bended portions 3b, 3c and 3d. Further, since the vibrations are absorbed by the function of the material itself of the noise absorbent member 4 and the function as the inertia mass, the fine vibrations at the portions of the cord 3 below the noise absorbent member 4 are almost removed.

Further, even if the cord 3 is held by hand, and the fine vibrations should occur in the vertical direction V, when the fine vibrations reach the portions of the cord 3 inserted into the noise absorbent member 4, the vibration direction is changed at the bended portion 3a so that the vibrations are absorbed, and the fine vibrations in the vertical direction V are rapidly damped. Thereafter, the fine vibrations at the portion of the cord 3 below the noise absorbent member 4 are almost removed in the manner similar to that described above.

Since the fine vibrations in both the horizontal and vertical directions generated in the cord 3 are materially damped at the noise absorbent member 4, the fine vibrations are rarely detected at the pickup 2, thus making it hard to occur an inconvenience in that the noise generated by the cord 3 is mixed into the detection signal.

Accordingly, when the other end of the cord 3 of the vibration detecting apparatus 1 according to the present invention is connected to a voltage amplifier 15, and a head-phone 16 is connected to the voltage amplifier 15, only the fine vibrations picked up by the pickup 2 and propagated through the ground are amplified, and the signal is changed to detect a clear water-leakage sound. Thereby, particular care need not be paid to handling of the cord for preventing the noise from being mixed as in prior art but the water-leakage detection work can be progressed effectively to shorten the work time, the water-leakage sound can be easily listened to, and the detection accuracy can be enhanced.

(Experiment to confirm noise absorbent effect)

Next, the noise absorbent effect was confirmed by using a normal vibration detecting apparatus 52 not provided with a noise absorbent member, a vibration detecting apparatus 62 formed with a winding portion in the cord, and the vibration detecting apparatus 1 according to the present invention provided with the noise absorbent member 4.

Figure 5:
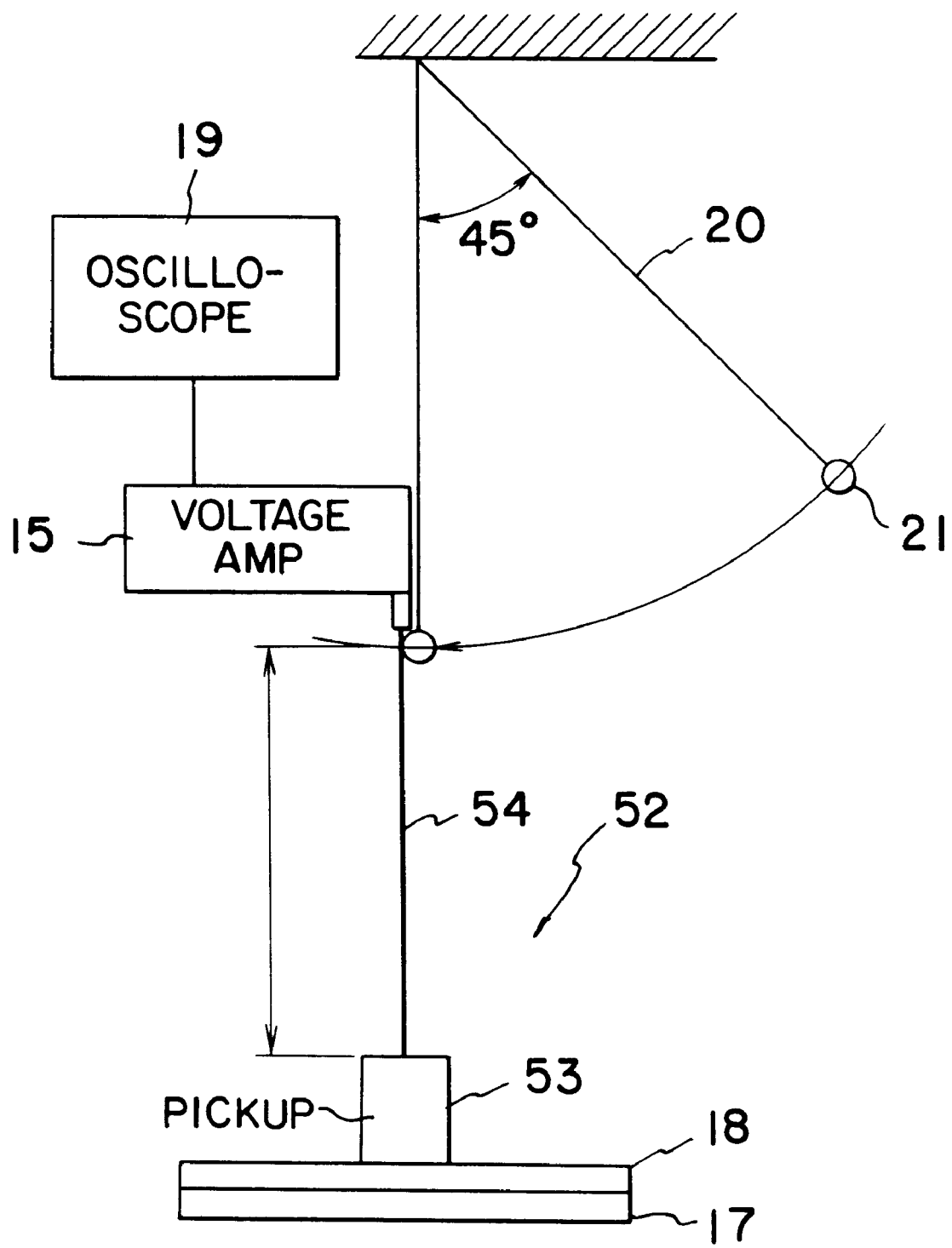
FIG. 5 is a constitutional view of an experimental apparatus for confirming the effect of the vibration detecting apparatus.
Figure 6:
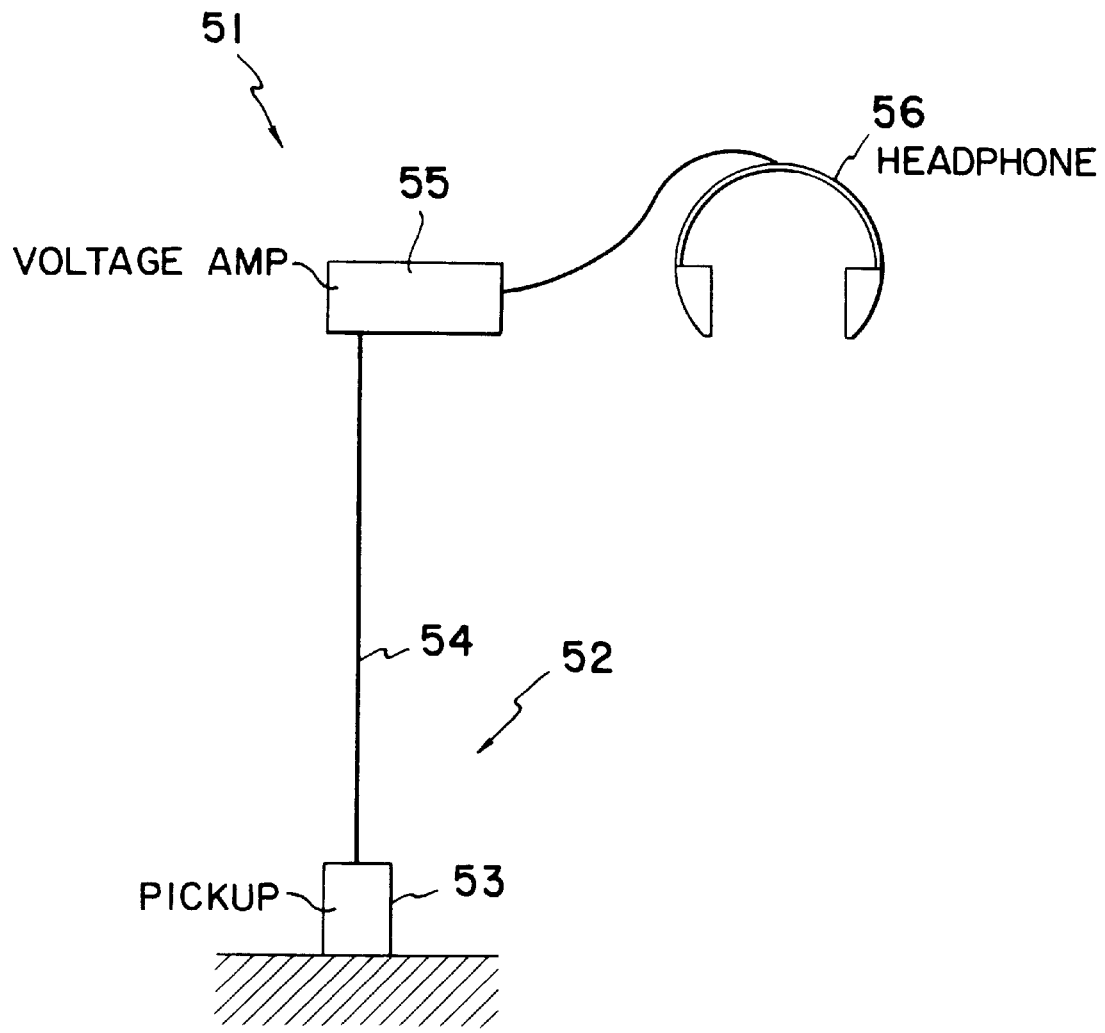
FIG. 6 is a constitutional view of the water-leakage detector in the case where a normal vibration detecting apparatus not provided with a noise absorbent member is used.
Figure 7:
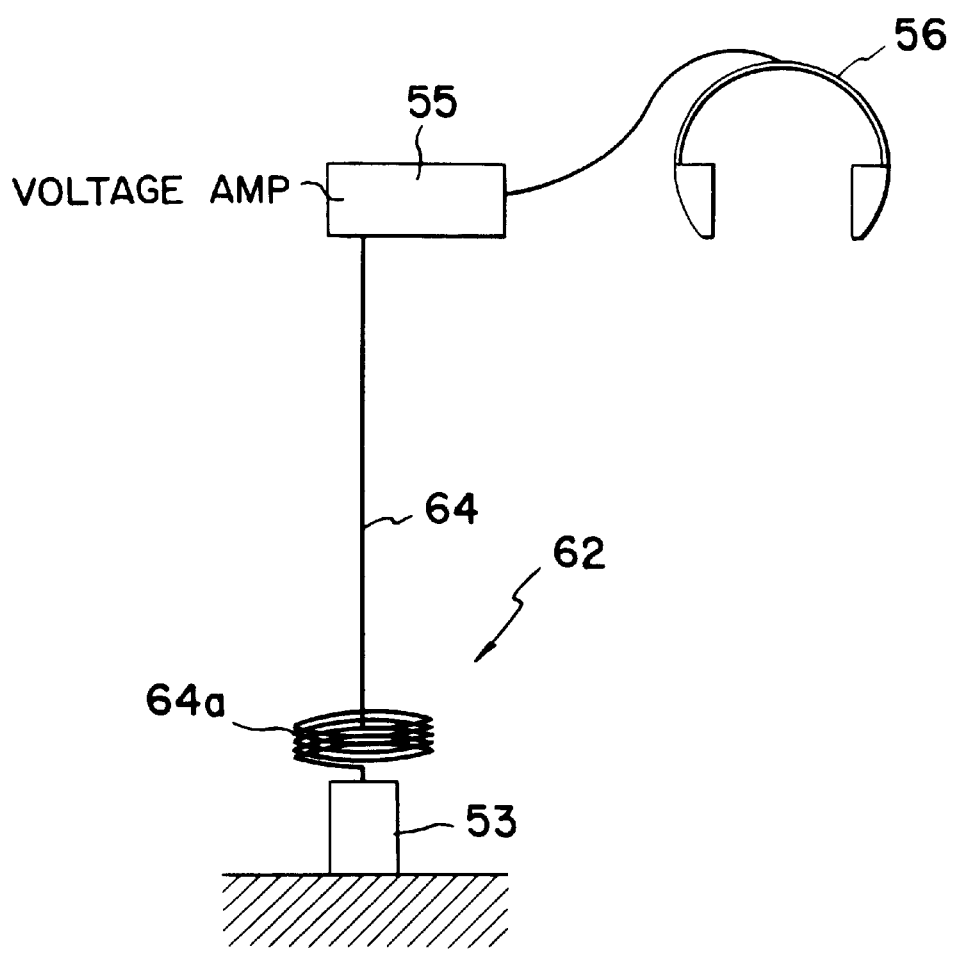
FIG. 7 is a constitutional view of a water-leakage detector in the case where a vibration detecting apparatus having a cord formed with a winding portion is used.
Figure 8:
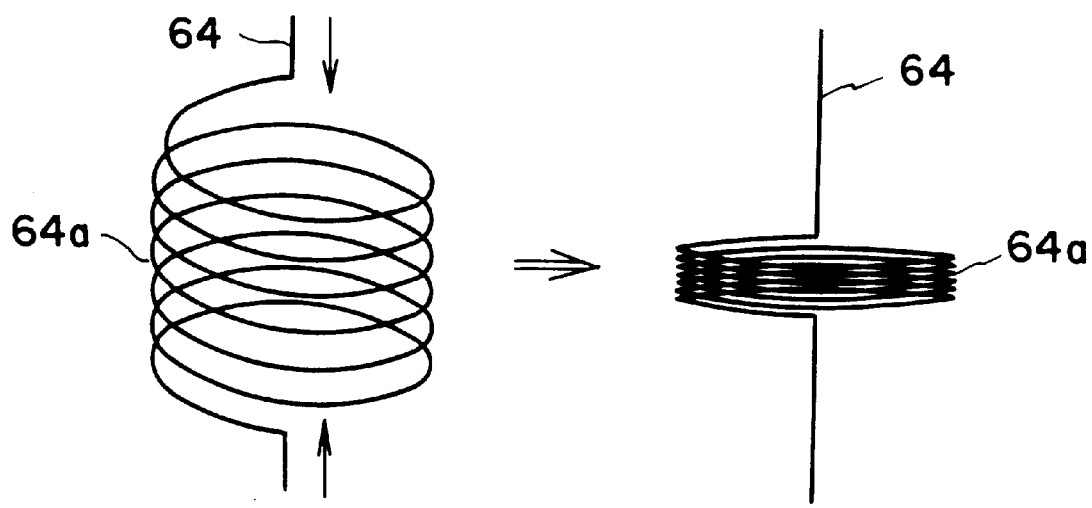
FIG. 8 is an explanatory view showing that noises are generated in the cord formed with the winding portion.

The configuration of the experimental apparatus is as shown in FIG. 5. A sheet 17 made of low repulsion elastic rubber and a sheet 18 made of sponge rubber are placed one upon another on the floor surface in the room, pickups 53, 2 of the aforementioned respective vibration detecting apparatuses are provided thereon, the voltage amplifier 15 is connected to cords 54, 64, 3 of the aforementioned respective vibration detecting apparatuses, and an oscilloscope 19 is connected.

The cords 54, 64, 3 of the aforementioned respective vibration detecting apparatuses used were 80 cm in length.

In the vibration detecting apparatus 62 formed with a winding portion 64a in the cord 64, the winding portion 64a was formed at a position 3 cm from the upper end of the pickup 53.

In the vibration detecting apparatus according to the present invention having the noise absorbent member 4 mounted thereon, the noise absorbent member 4 is formed of polynorbornen rubber which is low repulsion elastic rubber, which is formed to be spherical having 30 mm of the outside diameter and has the cord insert path 14 in the shape of substantially U having 4.5 mm of the inside diameter, as shown in FIG. 2. It was sequentially moved to the positions 1, 3, 5, 10, 40 and 65 cm from the upper end of the pickup 2.

As shown in FIG. 5, a round bar 21 was suspended from the ceiling surface or the like by means of a string 20, the round bar 21 was moved to a position at 45° formed between the string 20 and the vertical axis and caused to naturally drop while quietly letting go of hand and thence placed in abutment with the position 80 cm from the upper end of the pickups 53, 2 of the cords 54, 64, 3. At this time, the voltage generated at the pickups 53, 2 was amplified and measured by the oscilloscope 19. The measured results were as shown in Table 1.

As will be apparent from Table 1, in the vibration detecting apparatus 62 formed with the winding portion 64a in the cord 64 and the vibration detecting apparatus 1 according to the present invention provided with the noise absorbent member 4, the noise caused by the vibration of the cord is reduced to half as compared with the normal vibration detecting apparatus 52 not provided with the noise absorbent member. Particularly, in the vibration detecting apparatus 1 according to the present invention, the noise is reduced to ⅔ or more.

Further, when the noise absorbent member 4 is set at a position 3 cm from the upper end of the pickup 2, the noise is mostly absorbed, and the absorbent efficiency lowers as it is set upper or lower than the above position. This is because of the fact that when set upper than 3 cm, the vibration in the cord portion lower than the position at which the noise absorbent member 4 is set cannot be absorb sufficiently. When in 65 cm, the vibration absorbent effect is rarely obtained. On the other hand, when lower than 3 cm, the vibration in the cord portion upper than the position at which the noise absorbent member 4 is set tends to directly reach the pickup 2.

TABLE 1

| MODE OF VIBRATION DETECTING APPARATUS | MOUNTING POSITION | OUTPUT VOLTAGE |
|---|---|---|
| NOISE ABSORBENT MEMBER NOT MOUNTED | — | 200 mV |
| CODE FORMED WITH WINDING PORTION | 3 cm | 100 mV |
| NOISE ABSORBENT MEMBER MOUNTED (VIBRATION DETECTING APPARATUS OF PRESENT INVENTION) | 1 cm | 100 mV |
| | 3 cm | 60 mV |
| | 5 cm | 125 mV |
| | 10 cm | 100 mV |
| | 40 cm | 125 mV |
| | 65 cm | 200 mV |

The invention claimed is:

1. A vibration detecting apparatus comprising a pickup encasing a piezoelectric element therein, a cord for transmitting an electric signal output by the piezoelectric element, and a noise absorbent member in the form of a lump made of rubber, and formed therein with a cord insert path having at least one direction-changing portion, said noise absorbent member being mounted at a suitable position of said cord.

2. The vibration detecting apparatus according to claim 1, wherein the mounting position of said noise absorbent member to said cord is a position in the vicinity of said pickup.

3. The vibration detecting apparatus according to claim 1 or 2, wherein the noise absorbent member is made of low repulsion elastic rubber.

4. The vibration detecting apparatus according to any of claims 1 or 2, wherein the noise absorbent member is spherical.

5. The vibration detecting apparatus according to any of claims 1 or 2, wherein said cord insert path of the noise absorbent member is substantially in the shape of U.

6. A noise absorbent member for use with a vibration detection apparatus which comprises a vibration pickup with a cord for transmitting electric signals output by the vibration pickup, said noise absorbent member in the form of a lump of rubber having formed therein a cord insert path, said cord insert path having at least one direction-changing portion, whereby said cord of said vibration detection apparatus is housed in said cord insert path such that said noise absorbent member absorbs the vibrations of said cord of the vibration detection apparatus.

7. The noise absorbent member according to claim 6, which is made of low repulsion elastic rubber.

8. The noise absorbent member according to claim 6 or 7, which is spherical.

9. The noise absorbent member according to any of claims 6 or 7, wherein said cord insert path is substantially in the shape of U.

* * * * *